Jan. 27, 1953  A. WALTERT  2,626,582
TRANSFORMER ASSEMBLING DEVICE
Filed Aug. 4, 1947
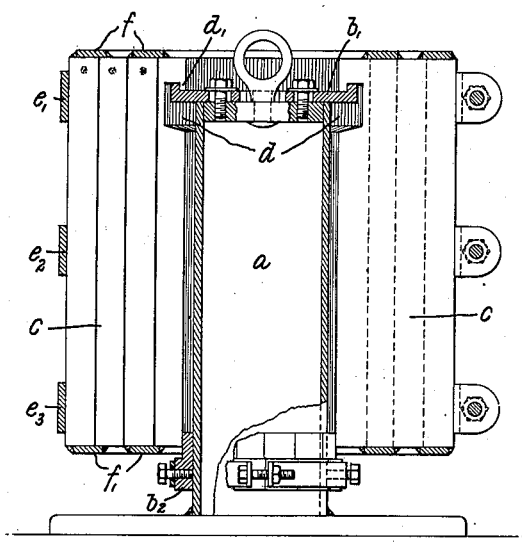
Inventor:
August Waltert,
By Pierce, Scheffler & Parker,
Attorneys.

Patented Jan. 27, 1953

2,626,582

UNITED STATES PATENT OFFICE 2,626,582

TRANSFORMER ASSEMBLING DEVICE

August Waltert, Ennetbaden, Switzerland, assignor to Aktiengesellschaft Brown, Boveri & Cie., Baden, Switzerland Application August 4, 1947, Serial No. 766,077
In Switzerland March 17, 1942

Section 1, Public Law 690, August 8, 1946
Patent expires March 17, 1962

1 Claim. (Cl. 113—99)

Radial laminated iron cores of circular cross-section for transformers, generally consist of two halves which are fitted together, each half being produced separately in a horizontal trough in which the laminations are arranged in parallel layers so to as form sector-shaped elements. Cores manufactured in this way can easily attain an eccentric shape. Great care has to be exercised when arranging the sheets and during the pressing process, and in certain cases it may even be necessary to make some corrections afterwards.

The present invention concerns a device for manufacturing iron cores of circular cross-section for transformers, the cores being composed of sector-shaped elements made up of parallel layers of laminations having different widths, the widest lamination of each element being arranged to lie in a radial direction. According to the present invention the aforementioned disadvantages are avoided by providing the elements with suspension means with the aid of which they are suspended next to each other from an auxiliary support and aligned with respect to this support, this latter being removed after the elements have been pressed and connected together.

A constructional example of the invention is shown in Fig. 1 of the drawing in longitudinal section, whilst Fig. 2 shows a cross-section through an element of the core.

In Fig. 1, $a$ indicates the column-shaped auxiliary support preferably of circular cross-section, provided at the top with a suspension plate $b_1$ and at the bottom with a cylindrical aligning sleeve $b_2$ for the elements $c$ which form the radial laminated iron core. These elements consist of sheets of different width which are arranged in layers to form a sector, the widest sheet being arranged radially (Fig. 2). It is expedient to join the adjacent sheets of a sector or element by spot welding, at least on one of the short sides. The widest sheet of each element is provided near one end with a recess $d$ having such a shape that a holding nose $d_1$ is formed on the element. The suspension plate $b_1$ at the top of the support $a$ possesses a circular rim or alternatively a circular slot corresponding to the nose $d_1$ for the reception of this latter, and the sleeve $b_2$ at the bottom of the column $a$ functions to align the elements at the other end. Both the suspension plate $b_1$ and the aligning sleeve $b_2$ are fixed to the support $a$ in a disconnectable manner and made in several sections to enable them to be easily removed.

After the required number of elements $c$ for building the core have been suspended from the plate $b_1$ and arranged next to each other, the other ends resting against the aligning sleeve $b_2$, the latter is removed. The elements which thus form a structure having an annular cross-section then support themselves. Thereupon the core elements are pressed together with the aid of steel bands and turnbuckles $e_1$, $e_2$, $e_3$ or clamping rings and bolts. In order to be able to press the elements sufficiently, care must be taken that the suspension means allow sufficient radial clearance between the elements and the central support, that is the recess $d$ must have adequate clearance behind the nose $d_1$. After pressing the core, the elements $c$ are welded together across their end surfaces, this being done preferably with the aid of the end rings $f_1$, $f_2$. The pressing means $e_1$, $e_2$, $e_3$ and the suspension plate $b_1$ are now removed and the finished core taken from the support. Any wedge-shaped gaps between the short adjoining sheets are filled out with an oil-proof plastic mass if necessary, which when it hardens does not shrink, for instance cement.

The device according to the invention enables an absolutely circular cross-section to be obtained because the sheets inside the elements while still under pressure are not upset and displacements and deformations from upsetting during pressing as a result of the radial pressure exerted on the elements from all sides, are avoided.

Other suspension means than the recesses provided in the elements of the core and shown in the illustrated constructional example, can also be used.

I claim:

Apparatus for assembling a transformer core from a plurality of sector-shaped groups of laminations, each said group comprising a plurality of laminations of progressively increasing width secured in face to face relation and in which the widest lamination of each group is recessed along its inner edge adjacent the upper end to provide a holding nose for the group, said apparatus comprising a vertical columnar support, a circular horizontal plate at the upper end of said support having a diameter greater than the width of said columnar support so as to project beyond the surface of the support, the periphery of said plate having an upturned flange enabling all of said lamination groups to be hung vertically on said plate by their nose portions which engage said flange, said lamination groups when so hung forming an annular core with the sides of adjacent lamination groups in surface contact and the inner edge of the widest lamination of each group being spaced from the periphery of said plate and from the surface of said columnar support to permit of a slight radially inward movement of said lamination groups, a sleeve member removably mounted on said columnar support engageable with the lower end of the widest lamination of each said lamination group for initially aligning the groups in surface contact with one another along the axis of the columnar support, a plurality of clamping bands adapted to be placed around the outer edges of said lamination groups subsequent to formation of the annular core therefrom, and means for tightening said bands upon removal of said sleeves thereby to force all of said lamination groups radially inward and establish pressure contact therebetween in preparation for securing said groups permanently together such as by welding rings across their top and bottom faces while subjected to said pressure.

AUGUST WALTERT.

REFERENCES CITED

The following references are of record in the file of this patent:

UNITED STATES PATENTS

| Number | Name | Date |
|---|---|---|
| 1,472,863 | Bingay | Nov. 6, 1923 |
| 1,508,342 | Lee | Sept. 9, 1924 |
| 1,651,403 | Mougey | Dec. 6, 1927 |
| 2,155,264 | Freed | Apr. 18, 1939 |
| 2,157,441 | Sullivan | May 9, 1939 |
| 2,327,352 | Hoover | Aug. 24, 1943 |
| 2,341,752 | West | Feb. 15, 1944 |
| 2,433,339 | Brown | Dec. 30, 1947 |
| 2,445,766 | Derby | July 27, 1948 |
| 2,468,786 | Sealey | May 3, 1949 |

FOREIGN PATENTS

| Number | Country | Date |
|---|---|---|
| 504,328 | France | June 30, 1920 |
| 482,771 | Great Britain | July 8, 1937 |